(12) United States Patent
Saito et al.

(10) Patent No.: US 11,519,375 B2
(45) Date of Patent: Dec. 6, 2022

(54) HYBRID VEHICLE AND METHOD FOR CONTROLLING HYBRID VEHICLE

(71) Applicant: TOYOTA JIDOSHA KABUSHIKI KAISHA, Toyota (JP)

(72) Inventors: Tatsuki Saito, Toyota (JP); Hiroyuki Azuma, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 17/242,468

(22) Filed: Apr. 28, 2021

(65) Prior Publication Data

US 2021/0394741 A1 Dec. 23, 2021

(30) Foreign Application Priority Data

Jun. 23, 2020 (JP) .............................. JP2020-108288

(51) Int. Cl.
*F02N 11/08* (2006.01)
*F02N 11/00* (2006.01)

(52) U.S. Cl.
CPC .......... *F02N 11/00* (2013.01); *F02N 11/0866* (2013.01); *F02N 2011/0888* (2013.01)

(58) Field of Classification Search
CPC ................ F02N 11/00; F02N 11/0866; F02N 2011/0888; Y02T 10/62; Y02T 10/70; B60K 6/445; B60K 6/28; B60W 10/06; B60W 10/08; B60W 10/26; B60W 10/30; B60W 30/194; B60W 20/15; B60W 20/00; B60W 2510/0676; B60W 2510/244; B60W 2510/246; B60W 2710/305
USPC ................ 123/179.3, 179.4, 179.25, 179.28; 701/113; 290/31, 32, 34, 36 r, 38 r, 40 r
See application file for complete search history.

(56) References Cited

U.S. PATENT DOCUMENTS

2017/0355373 A1 12/2017 Dalum

FOREIGN PATENT DOCUMENTS

| JP | 2008-247128 A | 10/2008 |
|----|---------------|---------|
| JP | 2008-251404 A | 10/2008 |

*Primary Examiner* — Hai H Huynh
(74) *Attorney, Agent, or Firm* — Oliff PLC (57) ABSTRACT

A hybrid vehicle includes: an engine; a motor; a drive system battery connected to a drive system power line; an auxiliary system battery connected to an auxiliary system power line; a bidirectional power converter configured to step down power on the drive system power line to supply the stepped-down power to the auxiliary system power line, and configured to boost power on the auxiliary system power line to supply the boosted power to the drive system power line; and a control device. The control device is configured to, upon a cold start in which the engine is started, control the engine, the motor, and the bidirectional power converter to cause the motor to crank the engine while causing the bidirectional power converter to boost the power on the auxiliary system power line to supply the boosted power to the drive system power line.

4 Claims, 4 Drawing Sheets

HYBRID VEHICLE AND METHOD FOR CONTROLLING HYBRID VEHICLE

CROSS-REFERENCE TO RELATED APPLICATION

This application claims priority to Japanese Patent Application No. 2020-108288 filed on Jun. 23, 2020, incorporated herein by reference in its entirety.

BACKGROUND

1. Technical Field

The disclosure relates to hybrid vehicles and methods for controlling a hybrid vehicle.

2. Description of Related Art

A hybrid vehicle is known in the art in which, when an engine is cold started, an output limit Wout of a battery is set to an output higher than the rated output of the battery based on the state of charge SOC and the battery temperature Tb (see, e.g., Japanese Unexamined Patent Application Publication No. 2008-251404 (JP 2008-251404 A)). In this hybrid vehicle, the engine is started by motoring the engine by a motor within the output limit Wout that is higher than the rated output.

SUMMARY

In the above hybrid vehicle, however, the output limit Wout is set to the output higher than the rated output, and the engine is started by motoring the engine by the motor within the output limit Wout. Driving the motor using the output limit Wout facilitates battery degradation. One way to reduce such battery degradation is to mount a battery with a higher rated output. However, this increases not only the size and weight of the battery but also cost.

The disclosure provides a hybrid vehicle in which an engine is cold started while reducing both battery degradation and an increase in battery size.

A first aspect of the disclosure relates to a hybrid vehicle. The hybrid vehicle includes: an engine; a motor configured to crank the engine; a drive system battery connected to a drive system power line, the drive system power line being configured to supply and receive power to and from the motor; an auxiliary system battery connected to an auxiliary system power line, the auxiliary system power line having a voltage lower than a voltage of the drive system power line, the auxiliary system battery being configured to supply power to auxiliary equipment; a bidirectional power converter connected to the drive system power line and the auxiliary system power line, configured to step down power on the drive system power line to supply the stepped-down power to the auxiliary system power line, and configured to boost power on the auxiliary system power line to supply the boosted power to the drive system power line; and a control device configured to control the engine, the motor, and the bidirectional power converter. The control device is configured to, upon a cold start in which the engine is started when a temperature of the engine is lower than a predetermined temperature, control the engine, the motor, and the bidirectional power converter to cause the motor to crank the engine while causing the bidirectional power converter to boost the power on the auxiliary system power line to supply the boosted power to the drive system power line.

According to the first aspect, the hybrid vehicle of the disclosure includes the bidirectional power converter connected to the drive system power line to which the drive system battery is connected and the auxiliary system power line to which the auxiliary system battery is connected. The bidirectional power converter steps down the power on the drive system power line to supply the stepped-down power to the auxiliary system power line, and boosts the power on the auxiliary system power line to supply the boosted power to the drive system power line. Upon a cold start in which the engine is started when the temperature of the engine is lower than the predetermined temperature, the engine, the motor, and the bidirectional power converter are controlled so that the motor cranks the engine while the bidirectional power converter boosts the power on the auxiliary system power line to supply the boosted power to the drive system power line. That is, the engine is started by driving the motor with the power supplied from the bidirectional power converter to the drive system power line and the power output from the drive system battery. With the above configuration, the engine can be cold started while restraining power larger than allowable output power from being output from the drive system battery. The above configuration also reduces an increase in size and weight of the drive system battery which is caused by increasing the allowable output power. As a result, the engine can be cold started while reducing both battery degradation and an increase in battery size.

In the first aspect, the control device may be configured to, upon the cold start, control the engine, the motor, and the bidirectional power converter to cause the motor to crank the engine while causing the bidirectional power converter to boost the power on the auxiliary system power line to supply the boosted power to the drive system power line, when required start power that is required to start the engine is larger than the allowable output power that is able to be output from the drive system battery.

According to the above configuration, the bidirectional power converter does not need to boost the power on the auxiliary system power line to supply the boosted power to the drive system power line when the engine can be started within the allowable output power of the drive system battery.

In the above aspect, the control device may be configured to, upon the cold start, control the bidirectional power converter to supply either differential power between the required start power and the allowable output power or maximum power the bidirectional power converter is able to supply from the auxiliary system power line to the drive system power line, whichever is smaller, from the auxiliary system power line to the drive system power line, when the required start power is larger than the allowable output power. The above configuration restrains the bidirectional power converter from being excessively operated.

A second aspect of the disclosure relates to a method for controlling a hybrid vehicle. The method according to the above aspect includes: upon a cold start in which the engine is started when a temperature of the engine is lower than a predetermined temperature, controlling the engine, the motor, and the bidirectional power converter to cause the motor to crank the engine while causing the bidirectional power converter to boost power on the auxiliary system power line to supply the boosted power to the drive system power line.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A mode for carrying out the disclosure will be described based on an embodiment.

Figure 1:
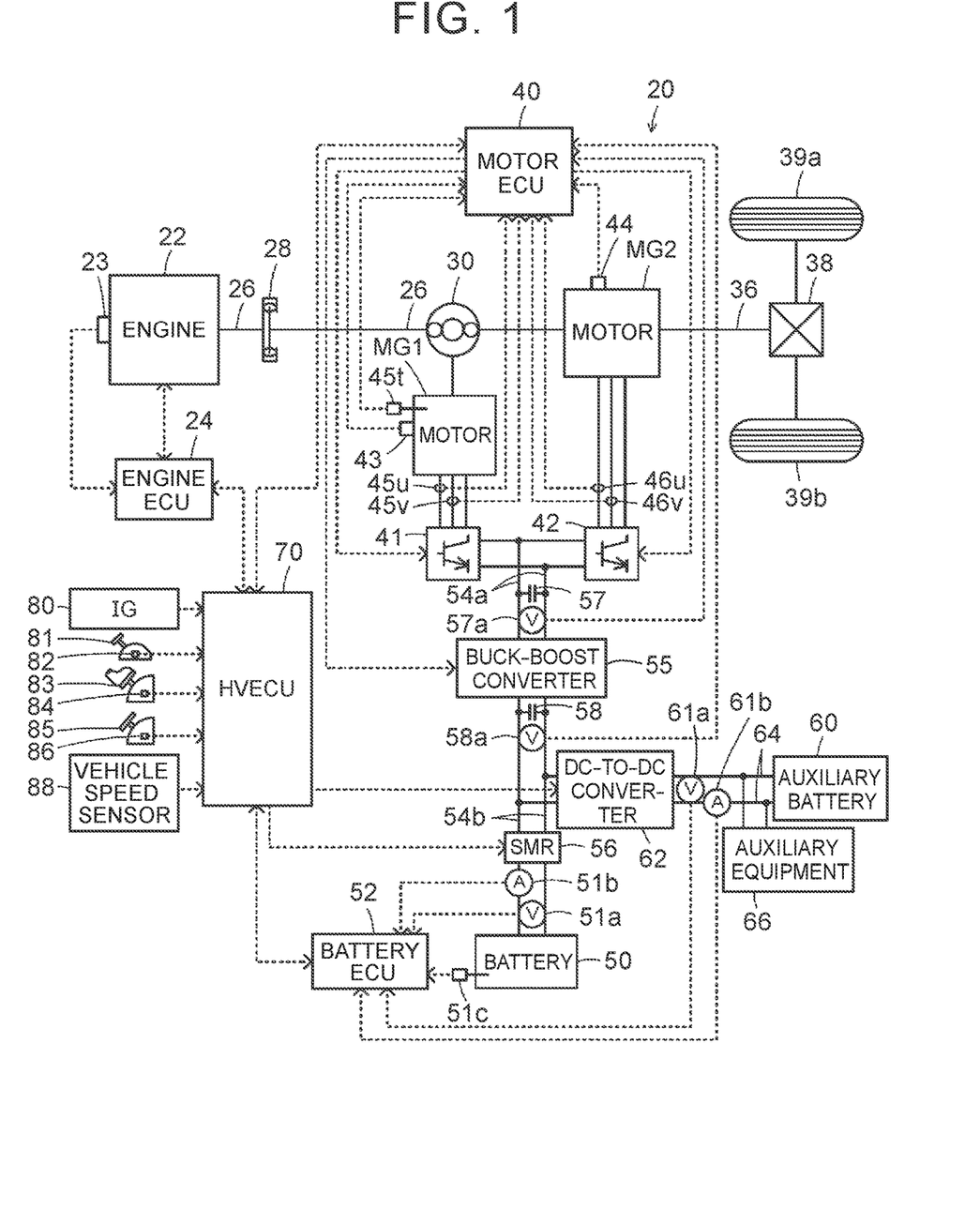
FIG. 1 is a block diagram schematically illustrating the configuration of a hybrid vehicle 20 according to an embodiment of the disclosure.

FIG. 1 is a block diagram schematically illustrating the configuration of a hybrid vehicle 20 according to an embodiment of the disclosure. As shown in the figure, the hybrid vehicle 20 of the embodiment includes an engine 22, a planetary gear 30, motors MG1, MG2, inverters 41, 42, a buck-boost converter 55, a battery 50 that is an electric energy storage device, a system main relay 56, an auxiliary battery 60, a bidirectional DC-to-DC converter 62, and a hybrid vehicle electronic control unit (hereinafter referred to as the "HVECU") 70.

The engine 22 is configured as an internal combustion engine that outputs power using gasoline, light oil, etc. as fuel. An engine electronic control unit (hereinafter referred to as the "engine ECU") 24 controls operation of the engine 22.

Although not shown in the figure, the engine ECU 24 is configured as a microprocessor mainly composed of a central processing unit (CPU). The engine ECU 24 includes, in addition to the CPU, a read-only memory (ROM) that stores processing programs, a random access memory (RAM) that temporarily stores data, input and output ports, and a communication port. The engine ECU 24 receives, via the input port, signals from various sensors that are necessary to control the operation of the engine 22. Examples of the signals that are input to the engine ECU 24 include: a crank angle $\theta cr$ from a crank position sensor 23 that detects the rotational position of a crankshaft 26 of the engine 22; and the coolant temperature Tw detected by a temperature sensor, not shown. The engine ECU 24 outputs, via the output port, various control signals for controlling the operation of the engine 22. The engine ECU 24 is connected to the HVECU 70 via the communication port. The engine ECU 24 calculates a rotational speed Ne of the engine 22 based on the crank angle $\theta cr$ from the crank position sensor 23.

The planetary gear 30 is configured as a single-pinion planetary gear mechanism. A rotor of the motor MG1 is connected to a sun gear of the planetary gear 30. A drive shaft 36 coupled to drive wheels 39a, 39b via a differential gear 38 is connected to a ring gear of the planetary gear 30. The crankshaft 26 of the engine 22 is connected to a carrier of the planetary gear 30 via a damper 28.

The motor MG1 is configured as a synchronous generator motor having a rotor with embedded permanent magnets and a stator with three-phase windings. As described above, the rotor of the motor MG1 is connected to the sun gear of the planetary gear 30. Like the motor MG1, the motor MG2 is also configured as a synchronous generator motor, and a rotor of the motor MG2 is connected to the drive shaft 36.

The inverter 41 is connected to a high voltage power line 54a and is configured as a well-known inverter circuit having six transistors and six diodes. Like the inverter 41, the inverter 42 is also connected to the high voltage power line 54a and is configured as a well-known inverter circuit having six transistors and six diodes. When energized, the inverters 41, 42 drive the motors MG1, MG2 to rotate by a rotating magnetic field produced in the three-phase coils of the motors MG1, MG2 by adjusting the ratio of the on-time between the paired transistors by a motor electronic control unit (hereinafter referred to as the "motor ECU") 40.

The buck-boost converter 55 is connected to the high voltage power line 54a and a low voltage power line 54b and is configured as a well-known buck-boost converter circuit having two transistors and two diodes, which form an upper arm and a lower arm, and a reactor. The buck-boost converter 55 boosts the power on the low voltage power line 54b to supply the boosted power to the high voltage power line 54a or steps down the power on the high voltage power line 54a to supply the stepped-down power to the low voltage power line 54b by adjusting the ratio of the on-time between the two transistors of the upper and lower arms by the motor ECU 40. A smoothing capacitor 57 is connected to a positive electrode line and a negative electrode line of the high voltage power line 54a, and a smoothing capacitor 58 is connected to a positive electrode line and a negative electrode line of the low voltage power line 54b.

Although not shown in the figure, the motor ECU 40 is configured as a microprocessor mainly composed of a CPU. The motor ECU 40 includes, in addition to the CPU, a ROM that stores processing programs, a RAM that temporarily stores data, input and output ports, and a communication port. The motor ECU 40 receives, via the input port, signals from various sensors that are required to control driving of the motors MG1, MG2 and the buck-boost converter 55. Examples of the signals that are input to the motor ECU 40 include: rotational positions $\theta m1$, $\theta m2$ from rotational position detection sensors 43, 44 that detect the rotational positions of the rotors of the motors MG1, MG2; phase currents Iu1, Iv1, Iu2, and Iv2 from current sensors 45u, 45v, 46u, and 46v that detect a current flowing in each phase of the motors MG1, MG2; a motor temperature tm1 from a temperature sensor 45t connected to the motor MG1; a voltage VH of the capacitor 57 (high voltage power line 54a) from a voltage sensor 57a connected between terminals of the capacitor 57; and a voltage VL of the capacitor 58 (low voltage power line 54b) from a voltage sensor 58a connected between terminals of the capacitor 58. The motor ECU 40 outputs, via the output port, various control signals for controlling driving of the motors MG1, MG2 and the buck-boost converter 55. Examples of the signals that are output from the motor ECU 40 include switching control signals for the transistors of the inverters 41, 42 and switching control signals for the transistors of the buck-boost converter 55. The motor ECU 40 is connected to the HVECU 70 via the communication port. The motor ECU 40 calculates electrical angles $\theta e1$, $\theta e2$ and rotational speeds Nm1, Nm2 of the motors MG1, MG2 based on the rotational positions $\theta m1$, $\theta m2$ of the rotors of the motors MG1, MG2 from the rotational position detection sensors 43, 44.

The battery 50 is configured as, e.g., a lithium-ion secondary battery or a nickel-metal hydride secondary battery and is connected to the low voltage power line 54b. A battery electronic control unit (hereinafter referred to as the "battery ECU") 52 manages the battery 50.

Although not shown in the figure, the battery ECU 52 is configured as a microprocessor mainly composed of a CPU.

The battery ECU 52 includes, in addition to the CPU, a ROM that stores processing programs, a RAM that temporarily stores data, input and output ports, and a communication port. The battery ECU 52 receives, via the input port, signals from various sensors that are necessary to manage the battery 50. Examples of the signals that are input to the battery ECU 52 include: a voltage Vb of the battery 50 from a voltage sensor 51a connected between terminals of the battery 50; a current Ib of the battery 50 from a current sensor 51b connected to the output terminal of the battery 50; and a temperature Tb of the battery 50 from a temperature sensor 51c connected to the battery 50. The battery ECU 52 is connected to the HVECU 70 via the communication port. The battery ECU 52 calculates the state of charge SOC based on an integrated value of the current Ib of the battery 50 from the current sensor 51b. The state of charge SOC is the ratio of the remaining capacity that can be discharged from the battery 50 to the maximum capacity of the battery 50. The battery ECU 52 also calculates an output limit Wout and an input limit Win of the battery 50 based on the temperature Tb of the battery 50 from the temperature sensor 51c and the state of charge SOC. The output limit Wout is the maximum allowable power (positive electric power) the battery 50 can discharge, and the input limit Win is the maximum allowable power (negative electric power) with which the battery 50 can be charged.

The system main relay 56 is provided at a position closer to the battery 50 than the capacitor 58 on the low voltage power line 54b. The system main relay 56 is turned on and off by the HVECU 70 to connect and disconnect the battery 50 to and from the buck-boost converter 55 side.

The auxiliary battery 60 is configured as a storage battery with a voltage lower than that of the battery 50, such as a lead-acid storage battery, and is connected to an auxiliary system power line 64. The auxiliary system power line 64 is connected to the low voltage power line 54b via the bidirectional DC-to-DC converter 62. The bidirectional DC-to-DC converter 62 is configured as a well-known bidirectional DC-to-DC converter. The bidirectional DC-to-DC converter 62 steps down the power on the low voltage power line 54b to supply the stepped-down power to the auxiliary system power line 64 or boosts the power on the auxiliary system power line 64 to supply the boosted power to the low voltage power line 54b. Auxiliary equipment 66 such as a steering gear is connected to the auxiliary system power line 64. A voltage sensor 61a that detects a voltage (auxiliary system voltage) Vh on the auxiliary system power line 64 and a current sensor 61b that detects a current (auxiliary system current) Ih flowing in the auxiliary system power line 64 via the bidirectional DC-to-DC converter 62 are connected to the auxiliary system power line 64 near the bidirectional DC-to-DC converter 62. The auxiliary system voltage Vh from the voltage sensor 61a and the auxiliary system current Ih from the current sensor 61b are input to the battery ECU 52 via the input port, not shown, of the battery ECU 52.

Although not shown in the figure, the HVECU 70 is configured as a microprocessor mainly composed of a CPU. The HVECU 70 includes, in addition to the CPU, a ROM that stores processing programs, a RAM that temporarily stores data, input and output ports, and a communication port. The HVECU 70 receives signals from various sensors via the input port. Examples of the signals that are input to the HVECU 70 include: an ignition signal from an ignition switch 80; a shift position SP from a shift position sensor 82 that detects the operation position of a shift lever 81; an accelerator operation amount Acc from an accelerator pedal position sensor 84 that detects the amount of depression of an accelerator pedal 83; a brake pedal position BP from a brake pedal position sensor 86 that detects the amount of depression of a brake pedal 85; and a vehicle speed V from a vehicle speed sensor 88. The HVECU 70 outputs drive control signals for the system main relay 56, drive control signals for the bidirectional DC-to-DC converter 62, etc. via the output port. As described above, the HVECU 70 is connected to the engine ECU 24, the motor ECU 40, and the battery ECU 52 via the communication port.

The hybrid vehicle 20 of the embodiment configured as described above travels in a hybrid vehicle mode (HV mode), an electric vehicle mode (EV mode), etc. The HV mode is a drive mode in which the engine 22 is operated and the motors MG1, MG2 are driven, and the EV mode is a drive mode in which the engine 22 is stopped and the motor MG2 is driven.

In the EV mode, the hybrid vehicle 20 basically travels as follows. The HVECU 70 first sets requested torque Td* requested for the hybrid vehicle 20 to travel, based on the accelerator operation amount Acc and the vehicle speed V. The HVECU 70 then sets a torque command Tm1* for the motor MG1 to a value of 0, and also sets a torque command Tm2* for the motor MG2 so that the requested torque Td* is output to the drive wheels 39a, 39b within an allowable driving range of the motor MG2. The HVECU 70 also sets a desired voltage VH* so that the motors MG1, MG2 can be efficiently driven by the torque commands Tm1*, Tm2*. The desired voltage VH* is a desired value of a voltage VH on the high voltage power line 54a. The HVECU 70 sends the set torque commands Tm1*, Tm2* for the motors MG1, MG2 and the set desired voltage VH* to the motor ECU 40. The motor ECU 40 controls switching of the transistors of the inverters 41, 42 so that the motors MG1, MG2 are driven by the torque commands Tm1*, Tm2*, and controls switching of the transistors of the buck-boost converter 55 so that the voltage VH on the high voltage power line 54a becomes equal to the desired voltage VH*.

In the HV mode, the hybrid vehicle 20 basically travels as follows. The HVECU 70 first sets requested torque Td* requested for the hybrid vehicle 20 to travel, based on the accelerator operation amount Acc and the vehicle speed V. The HVECU 70 also sets requested power Pd* requested by the driver for the hybrid vehicle 20 to travel, based on the set requested torque Td* and the vehicle speed V. The HVECU 70 then sets requested charge and discharge power Pb* (which takes a positive value when power is discharged from the battery 50) that is obtained by adding power Psoc that is required for the state of charge SOC of the battery 50 to become closer to a desired state of charge SOC*, etc. to power (auxiliary power) Ph that is require for the auxiliary equipment. The HVECU 70 then calculates requested power Pe* requested for the hybrid vehicle 20 (requested for the engine 22) by subtracting the requested charge and discharge power Pb* multiplied by efficiency η from the requested power Pd* and adding power Pac that is required for an air conditioner to the subtraction result. After setting the requested power Pe* in this manner, the HVECU 70 sets a desired rotational speed Ne* and desired torque Te* of the engine 22, torque commands Tm1*, Tm2* for the motors MG1, MG2, and a desired voltage VH* on the high voltage power line 54a so that the requested power Pe* is output from the engine 22 and the requested torque Td* is output to the drive wheels 39a, 39b within an allowable driving range of the engine 22 and the motors MG1, MG2. The HVECU 70 sets the desired rotational speed Ne* and the desired torque Te* of the engine 22 by applying the requested power Pe* to a fuel economy-first operation line in which the engine 22 is efficiently operated according to the situation and a power-first operation line in which priority is given to power. The torque command Tm1* for the motor MG1 is set to a value calculated by rotational speed feedback control for rotating the engine 22 at the desired rotation speed Ne*. The torque command Tm1* for the motor MG1 is the torque in such a direction that the rotational speed Ne of the engine 22 is reduced. Accordingly, the motor MG1 is driven to regenerate (functions as a generator) when the rotational speed Nm1 of the motor MG1 is positive (when the motor MG1 is rotating in the same direction as the engine 22). The torque command Tm2* for the motor MG2 is set to the requested torque Td* minus direct torque Ted of the engine 22 (Td*−Ted). The direct torque Ted of the engine 22 refers to the torque that is output from the engine 22 to the drive shaft 36 via the planetary gear 30 with the motor MG1 outputting the torque in such a direction that the rotational speed Ne of the engine 22 is reduced. The HVECU 70 then sends the desired engine speed Ne* and the desired torque Te* of the engine 22 to the engine ECU 24 and sends the torque commands Tm1*, Tm2* for the motors MG1, MG2 and the desired voltage VH* to the motor ECU 40. The engine ECU 24 performs intake air amount control, fuel injection control, ignition control, etc. of the engine 22 so that the engine 22 is operated at the desired rotational speed Ne* and the desired torque Te*. The motor ECU 40 controls switching of the transistors of the inverters 41, 42 so that the motors MG1, MG2 are driven by the torque commands Tm1*, Tm2*, and controls switching of the transistors of the buck-boost converter 55 so that the voltage VH on the high voltage power line 54a becomes equal to the desired voltage VH*.

Figure 2:
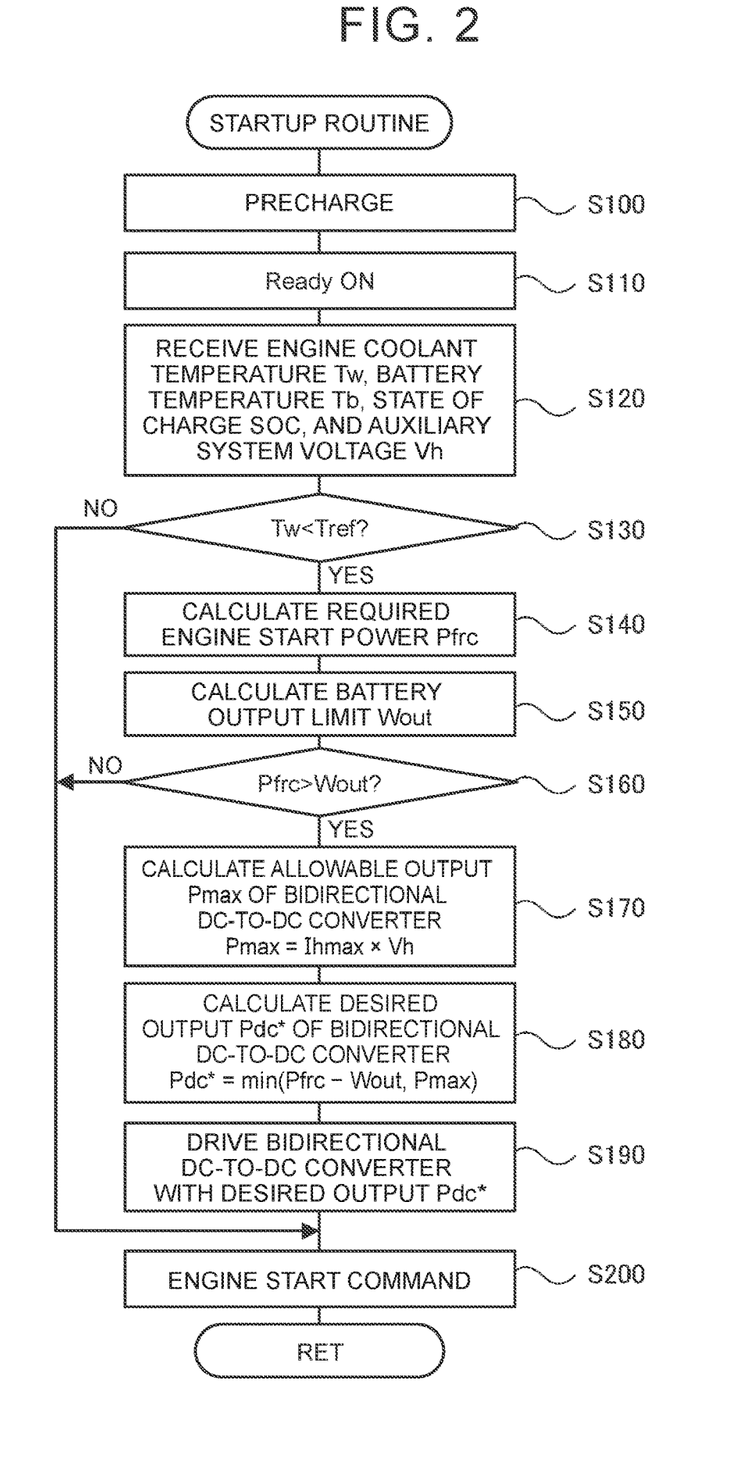
FIG. 2 is a flowchart illustrating an example of a startup routine that is executed by an HVECU 70.

Next, the operation of the hybrid vehicle 20 of the embodiment configured as described above, especially the operation that is performed when starting the engine 22 while the engine 22 is cold (cold start), will be described. FIG. 2 is a flowchart illustrating an example of a startup routine that is executed by the HVECU 70 when starting the engine 22.

In the startup routine, the HVECU 70 first performs precharging. Namely, the HVECU 70 operates the bidirectional DC-to-DC converter 62 to charge the capacitor 58 connected to the low voltage power line 54b (step S100). When the precharging is finished, the HVECU 70 turns on the system main relay 56 to complete preparation for driving (Ready ON) (step S110), and receives data that is necessary for control, such as the coolant temperature Tw of the engine 22, the temperature Tb of the battery 50, the state of charge SOC, and the auxiliary system voltage Vh (step S120). In the embodiment, the HVECU 70 receives the coolant temperature Tw detected by the temperature sensor, not shown, from the engine ECU 24 by communication. The HVECU 70 receives the temperature Tb of the battery 50 detected by the temperature sensor 51c from the battery ECU 52 by communication. The HVECU 70 receives the state of charge SOC calculated by the battery ECU 52 by communication. The HVECU 70 receives the auxiliary system voltage Vh detected by the voltage sensor 61a from the battery ECU 52 by communication.

After the HVECU 70 thus receives the data, the HVECU 70 determines whether the coolant temperature Tw of the engine 22 is lower than a threshold Tref (step S130). The threshold Tref is a threshold for determining whether the engine 22 is cold started, and is, e.g., 0° C., −5° C., etc. Since the threshold Tref is a value for determining whether the engine 22 is cold started, the HVECU 70 may determine whether the temperature of the engine 22 is lower than the threshold Tref. When the HVECU 70 determines that the coolant temperature Tw of the engine 22 is equal to or higher than the threshold Tref, the HVECU 70 sends a start command to start the engine 22 to the engine ECU 24 and the motor ECU 40 (step S200), and the routine is ended. In response to the start command, the motor ECU 40 performs boost control by the buck-boost converter 55 and switching control of the transistors of the inverter 41 so that the motor MG1 cranks the engine 22, and the engine ECU 24 performs fuel injection control, ignition control, etc. to start the engine 22 when the rotational speed Ne of the engine 22 reaches a predetermined rotational speed.

When the HVECU 70 determines in step S130 that the coolant temperature Tw of the engine 22 is lower than the threshold Tref, the HVECU 70 calculates power (required engine start power) Pfrc that is required to start the engine 22 (step S140) and calculates the output limit Wout of the battery 50 (step S150). The required engine start power Pfrc can be considered to be the sum of the friction and pumping loss of the engine 22. In the embodiment, the relationship between the coolant temperature Tw of the engine 22 and the required engine start power Pfrc is obtained in advance by experiments etc. and is stored in advance as a map for setting the required engine start power Pfrc. When the coolant temperature Tw is given to the HVECU 70, the HVECU 70 calculates the required engine start power Pfrc by deriving corresponding required engine start power Pfrc from the map. In the embodiment, regarding the output limit Wout of the battery 50, the relationship among the state of charge SOC of the battery 50, the temperature Tb of the battery 50, and the output limit Wout is obtained in advance by experiments etc. and is stored in advance as a map for setting the output limit Wout. When the state of charge SOC of the battery 50 and the temperature Tb of the battery 50 are given to the HVECU 70, the HVECU 70 calculates the output limit Wout by deriving a corresponding output limit Wout from the map.

Figure 3:
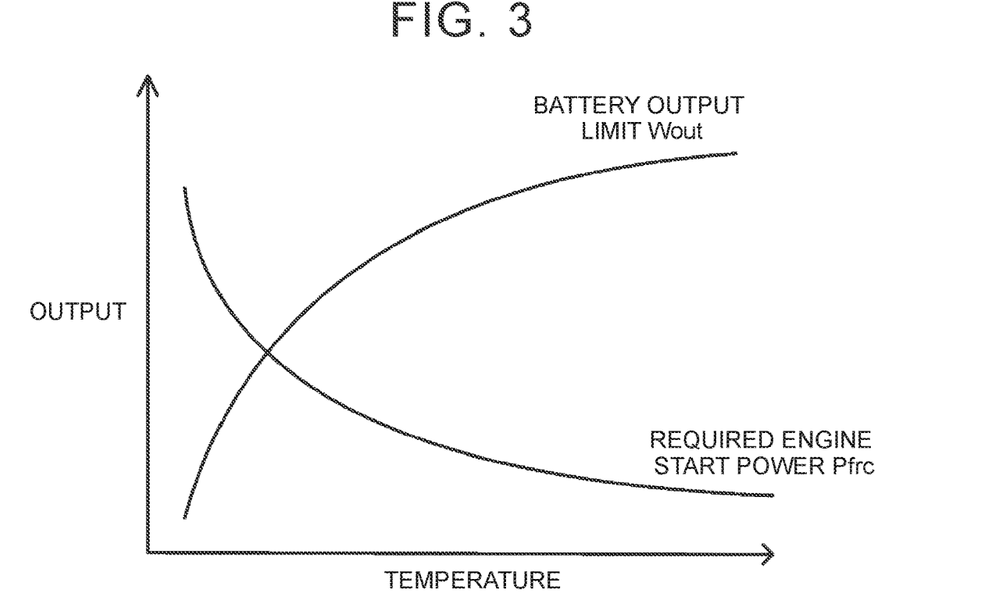
FIG. 3 is a graph illustrating an example of how required engine start power Pfrc and a battery output limit Wout change with the temperature.

Subsequently, the HVECU 70 determines whether the required engine start power Pfrc is larger than the output limit Wout of the battery 50 (step S160). FIG. 3 is a graph illustrating an example of how the required engine start power Pfrc and the battery output limit Wout change with the temperature. As shown in the figure, there is a case where the required engine start power Pfrc is larger than the output limit Wout of the battery 50 when the engine 22 is cold started. When the HVECU 70 determines that the required engine start power Pfrc is equal to or smaller than the output limit Wout of the battery 50, the HVECU 70 determines that it is possible to start the engine 22 by the output of the battery 50, and sends a start command to start the engine 22 to the engine ECU 24 and the motor ECU 40 (step S200), and the routine is ended. How the engine 22 is started is described above.

On the other hand, when the HVECU 70 determines that the required engine start power Pfrc is larger than the output limit Wout of the battery 50, the HVECU 70 determines that it is not possible to start the engine 22 by the output of the battery 50, and calculates allowable output Pmax that can be supplied from the bidirectional DC-to-DC converter 62 to the high voltage power line 54a (step S170). The allowable output Pmax can be calculated by multiplying the maximum current Ihmax that can be applied by the bidirectional DC-to-DC converter 62 by the auxiliary system voltage Vh.

Next, the HVECU 70 calculates a desired output Pdc* to be supplied from the bidirectional DC-to-DC converter 62 to the low voltage power line 54b (step S180). The desired output Pdc* is either the required engine start power Pfrc minus the output limit Wout of the battery 50 or the allowable output Pmax of the bidirectional DC-to-DC converter 62, whichever is smaller. The HVECU 70 then drives and controls the bidirectional DC-to-DC converter 62 so that the desired output Pdc* is supplied from the bidirectional DC-to-C converter 62 to the low voltage power line 54b (step S190). The HVECU 70 sends a start command to start the engine 22 to the engine ECU 24 and the motor ECU 40 (step S200), and the routine is ended. That is, any shortage in the required engine start power Pfrc shown in FIG. 3 due to the output limit Wout of the battery 50 is covered by the power that is supplied from the bidirectional DC-to-DC converter 62 to the low voltage power line 54b.

In the hybrid vehicle 20 of the embodiment described above, when it is determined that the coolant temperature Tw of the engine 22 is lower than the threshold Tref, the required engine start power Pfrc and the output limit Wout of the battery 50 are calculated, and it is determined whether the required engine start power Pfrc is larger than the output limit Wout of the battery 50. When it is determined that the required engine start power Pfrc is larger than the output limit Wout of the battery 50, the desired output Pdc* to be supplied from the bidirectional DC-to-DC converter 62 to the low voltage power line 54b is calculated. The desired output Pdc* is either the required engine start power Pfrc minus the output limit Wout of the battery 50 or the allowable output Pmax of the bidirectional DC-to-DC converter 62, whichever is smaller. The bidirectional DC-to-DC converter 62 is then driven and controlled so that the desired output Pdc* is supplied from the bidirectional DC-to-DC converter 62 to the low voltage power line 54b. A start command to start the engine 22 is also sent to the engine ECU 24 and the motor ECU 40 to start the engine 22. With the above configuration, the engine 22 can be cold started while restraining the power larger than the output limit Wout from being output from the battery 50. The above configuration also reduces an increase in size and weight of the battery 50 which is caused by increasing the output limit Wout. As a result, the engine 22 can be cold started while reducing both degradation of the battery 50 and an increase in size of the battery 50.

In the hybrid vehicle 20 of the embodiment, when it is determined that the required engine start power Pfrc is larger than the output limit Wout of the battery 50 at the time of a cold start of the engine 22, the desired output Pdc* to be supplied from the bidirectional DC-to-DC converter 62 to the low voltage power line 54b is calculated. The desired output Pdc* is either the required engine start power Pfrc minus the output limit Wout of the battery 50 or the allowable output Pmax of the bidirectional DC-to-DC converter 62, whichever is smaller. The bidirectional DC-to-DC converter 62 is then driven and controlled so that the desired output Pdc* is supplied from the bidirectional DC-to-DC converter 62 to the low voltage power line 54b. Alternatively, when it is determined that the required engine start power Pfrc is larger than the output limit Wout of the battery 50 at the time of a cold start of the engine 22, the bidirectional DC-to-DC converter 62 may be driven and controlled so that the allowable output Pmax is supplied from the bidirectional DC-to-DC converter 62 to the low voltage power line 54b, or the bidirectional DC-to-DC converter 62 may be driven and controlled so that predetermined power is supplied from the bidirectional DC-to-DC converter 62 to the low voltage power line 54b.

In the hybrid vehicle 20 of the embodiment, when it is determined that the required engine start power Pfrc is larger than the output limit Wout of the battery 50 at the time of a cold start of the engine 22, the bidirectional DC-to-DC converter 62 is driven and controlled so that the power is supplied from the bidirectional DC-to-DC converter 62 to the low voltage power line 54b. However, the bidirectional DC-to-DC converter 62 may always be driven and controlled at the time of a cold start of the engine 22 so that the power is supplied from the bidirectional DC-to-DC converter 62 to the low voltage power line 54b.

The hybrid vehicle 20 of the embodiment uses the battery 50 as an electric energy storage device. However, the hybrid vehicle 20 may use any device that can store electric energy, such as a capacitor.

The hybrid vehicle 20 of the embodiment includes the buck-boost converter 55. However, the hybrid vehicle 20 may not include the buck-boost converter 55.

The hybrid vehicle 20 of the embodiment includes the engine ECU 24, the motor ECU 40, the battery ECU 52, and the HVECU 70. However, at least two of these ECUs may be configured as a single electronic control unit.

Figure 4:
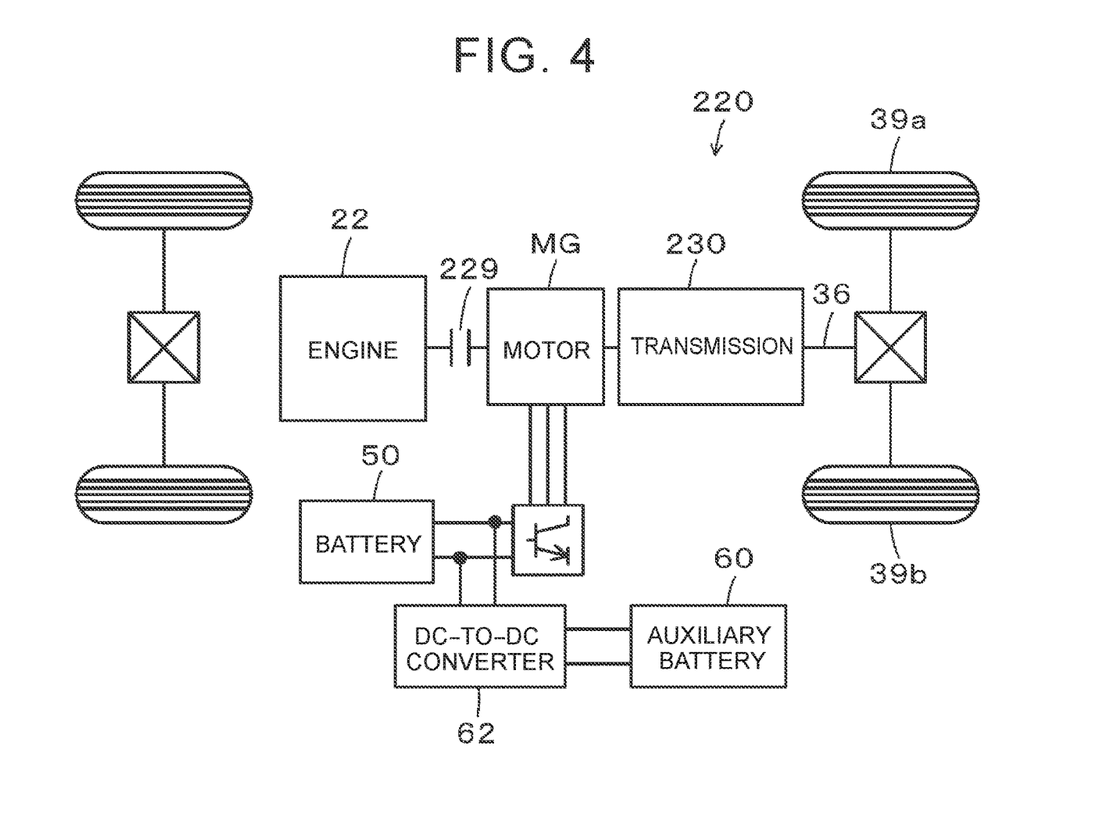
FIG. 4 is a block diagram schematically illustrating the configuration of a hybrid vehicle 220 of a modification.
Figure 5:
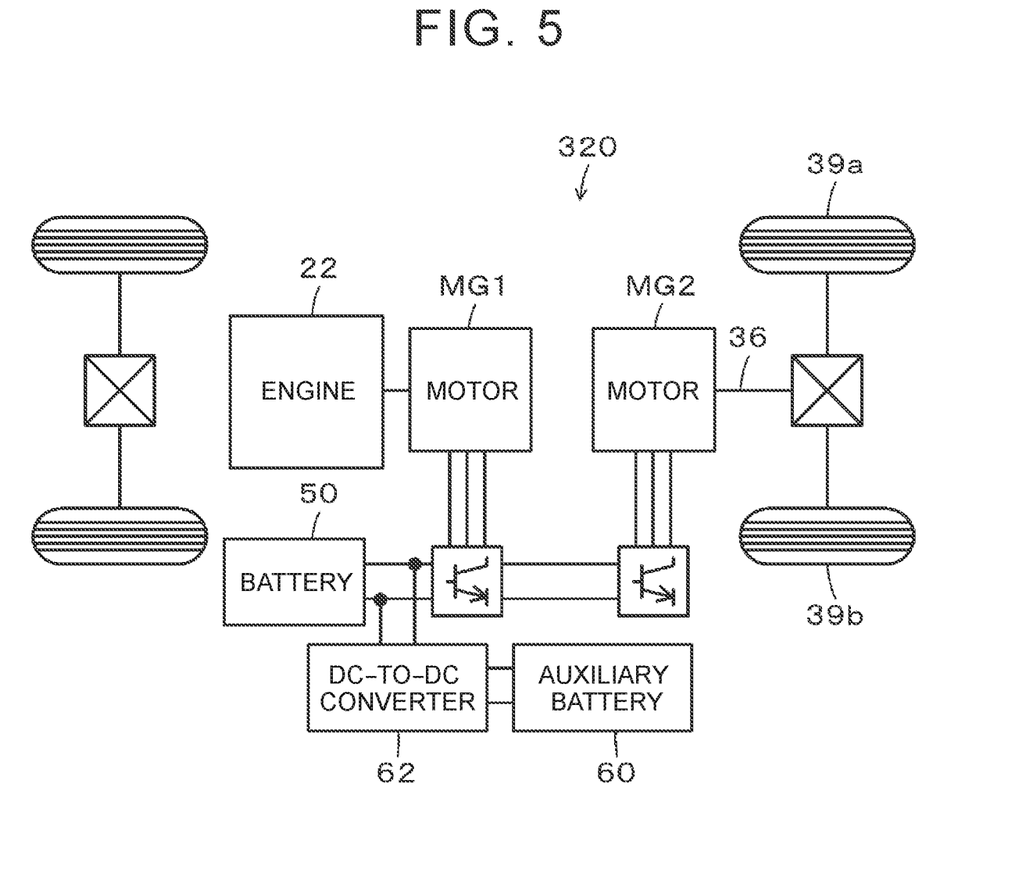
FIG. 5 is a block diagram schematically illustrating the configuration of a hybrid vehicle 320 of a modification.

In the hybrid vehicle 20 of the embodiment, the engine 22 and the motor MG1 are connected via the planetary gear 30 to the drive shaft 36 coupled to the drive wheels 39a, 39b, the motor MG2 is connected to the drive shaft 36, and the battery 50 is connected to the motors MG1, MG2 via the power lines. However, as shown in a hybrid vehicle 220 of a modification of FIG. 4, the hybrid vehicle may be configured as what is called a single-motor hybrid vehicle in which a motor MG is connected via a transmission 230 to the drive shaft 36 coupled to the drive wheels 39a, 39b, the engine 22 is connected to the motor MG via a clutch 229, and the battery 50 is connected to the motor MG via power lines. Alternatively, as shown in a hybrid vehicle 320 of a modification of FIG. 5, the hybrid vehicle may be configured as what is called a series hybrid vehicle in which a power generation motor MG1 is connected to the engine 22, a traction motor MG2 is connected to the drive shaft 36 coupled to the drive wheels 39a, 39b, and the battery 50 is connected to the motors MG1, MG2 via power lines.

Correspondence between the main elements of the embodiment and the main elements of the disclosure described in "SUMMARY" will be described. In the embodiment, the engine 22 corresponds to the "engine," the motor MG1 corresponds to the "motor," the battery 50 corresponds to the "drive system battery," the low voltage power line 54b corresponds to the "drive system power line," the auxiliary system power line 64 corresponds to the "auxiliary system power line," and the auxiliary battery 60 corresponds to the "auxiliary system battery." The bidirectional DC-to-DC converter 62 corresponds to the "bidirectional power converter," and the HVECU 70, the engine ECU 24, the motor ECU 40, and the battery ECU 52 correspond to the "control device."

The correspondence between the main elements of the embodiment and the main elements of the disclosure described in "SUMMARY" is shown merely by way of example in order to specifically describe the mode in which the embodiment carries out the disclosure described in "SUMMARY". Therefore, the correspondence is not intended to limit the elements of the disclosure described in "SUMMARY". That is, the disclosure described in "SUMMARY" should be construed based on the description in "SUMMARY", and the embodiment is merely a specific example of the disclosure described in "SUMMARY".

Although the mode for carrying out the disclosure is described above based on the embodiment, the disclosure is not limited in any way to the embodiment and can be carried out in various forms without departing from the spirit and scope of the disclosure.

The disclosure is applicable to the manufacturing industry of hybrid vehicles etc.

What is claimed is:

1. A hybrid vehicle, comprising:
an engine;
a motor configured to crank the engine;
a drive system battery connected to a drive system power line, the drive system power line being configured to supply and receive power to and from the motor;
an auxiliary system battery connected to an auxiliary system power line, the auxiliary system power line having a voltage lower than a voltage of the drive system power line, the auxiliary system battery being configured to supply power to an auxiliary equipment;
a bidirectional power converter connected to the drive system power line and the auxiliary system power line, configured to step down power on the drive system power line to supply the stepped-down power to the auxiliary system power line, and configured to boost power on the auxiliary system power line to supply the boosted power to the drive system power line; and
a control device configured to control the engine, the motor, and the bidirectional power converter, wherein the control device is configured to, upon a cold start in which the engine is started when a temperature of the engine is lower than a predetermined temperature, control the engine, the motor, and the bidirectional power converter to cause the motor to crank the engine while causing the bidirectional power converter to boost the power on the auxiliary system power line to supply the boosted power to the drive system power line.

2. The hybrid vehicle according to claim 1, wherein the control device is configured to, upon the cold start, control the engine, the motor, and the bidirectional power converter to cause the motor to crank the engine while causing the bidirectional power converter to boost the power on the auxiliary system power line to supply the boosted power to the drive system power line, when required start power that is required to start the engine is larger than allowable output power that is able to be output from the drive system battery.

3. The hybrid vehicle according to claim 2, wherein the control device is configured to, upon the cold start, control the bidirectional power converter to supply either differential power between the required start power and the allowable output power or maximum power the bidirectional power converter is able to supply from the auxiliary system power line to the drive system power line, whichever is smaller, from the auxiliary system power line to the drive system power line, when the required start power is larger than the allowable output power.

4. A method for controlling the hybrid vehicle according to claim 1, the method comprising upon a cold start in which the engine is started when a temperature of the engine is lower than a predetermined temperature, controlling the engine, the motor, and the bidirectional power converter to cause the motor to crank the engine while causing the bidirectional power converter to boost power on the auxiliary system power line to supply the boosted power to the drive system power line.

* * * * *